United States Patent
Mazzarisi et al.

(10) Patent No.: US 8,345,398 B2
(45) Date of Patent: Jan. 1, 2013

(54) INTEGRATED VARIABLE OUTPUT POWER SUPPLY PROTECTION CIRCUIT

(75) Inventors: Anthony G. Mazzarisi, Wadsworth, IL (US); Paul C. Burke, Lake Forest, IL (US); John N. Figh, Jr., Tampa, FL (US)

(73) Assignee: Telefonix, Incorporated, Waukegan, IL (US)

( * ) Notice: Subject to any disclaimer, the term of this patent is extended or adjusted under 35 U.S.C. 154(b) by 47 days.

(21) Appl. No.: 12/924,602

(22) Filed: Sep. 30, 2010

(65) Prior Publication Data
US 2012/0081816 A1 Apr. 5, 2012

(51) Int. Cl.
*H02H 9/08* (2006.01)
(52) U.S. Cl. .......................................... 361/93.9
(58) Field of Classification Search ............ 361/91.6, 361/93.9
See application file for complete search history.

(56) References Cited

U.S. PATENT DOCUMENTS

| | | | | |
|---|---|---|---|---|
| 3,703,679 A * | 11/1972 | Heidt | ............. | 323/278 |
| 4,835,649 A * | 5/1989 | Salerno | ............. | 361/18 |
| 5,296,800 A * | 3/1994 | Bjorkman et al. | ............. | 323/303 |
| 5,572,395 A * | 11/1996 | Rasums et al. | ............. | 361/58 |
| 5,914,542 A * | 6/1999 | Weimer et al. | ............. | 307/125 |
| 6,031,702 A * | 2/2000 | Williams | ............. | 361/87 |
| 6,061,259 A * | 5/2000 | DeMichele | ............. | 363/125 |
| 6,304,180 B1 * | 10/2001 | Platner et al. | ............. | 340/567 |
| 6,348,784 B1 * | 2/2002 | Gofman et al. | ............. | 323/289 |
| 2004/0070905 A1 * | 4/2004 | Chloupek et al. | ............. | 361/91.6 |

* cited by examiner

*Primary Examiner* — Ronald W Leja
(74) *Attorney, Agent, or Firm* — Niro, Haller & Niro

(57) ABSTRACT

A solid state power supply control circuit is disclosed. Specifically, the present invention discloses a power coupler enclosing a power supply control circuit, where the power control circuit enables transient increases in current in response to a demand from an active load device, while preventing overvoltage conditions from damaging the power coupler or the active load device. The power supply control circuit further prevents output faults in the power cable or a failure in the active load device from creating conditions which would damage the power coupler and/or the active load device.

3 Claims, 6 Drawing Sheets

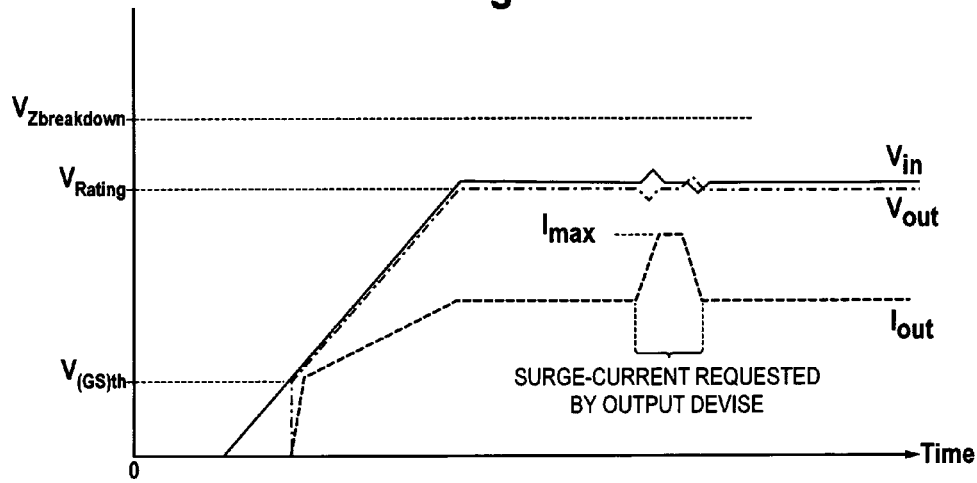
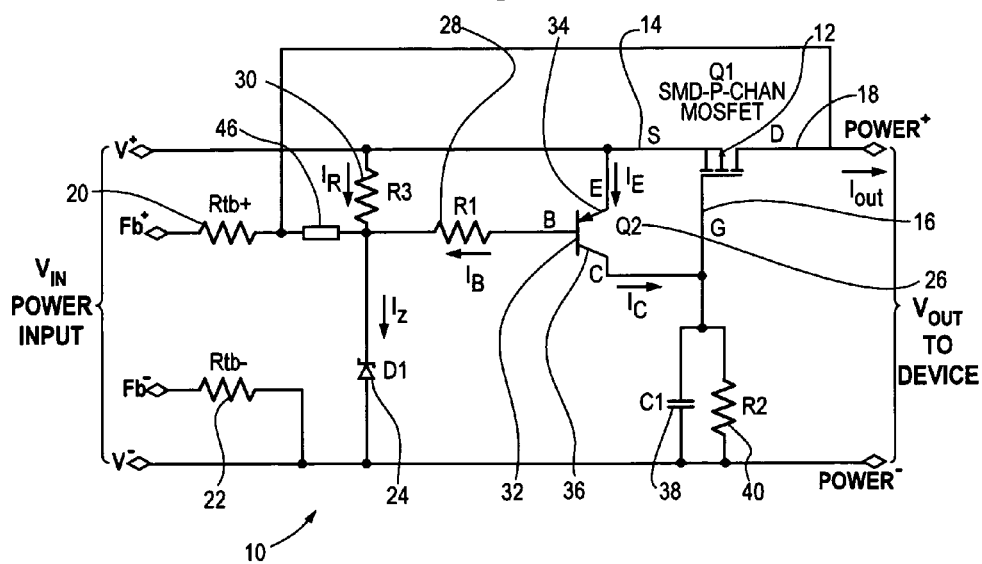

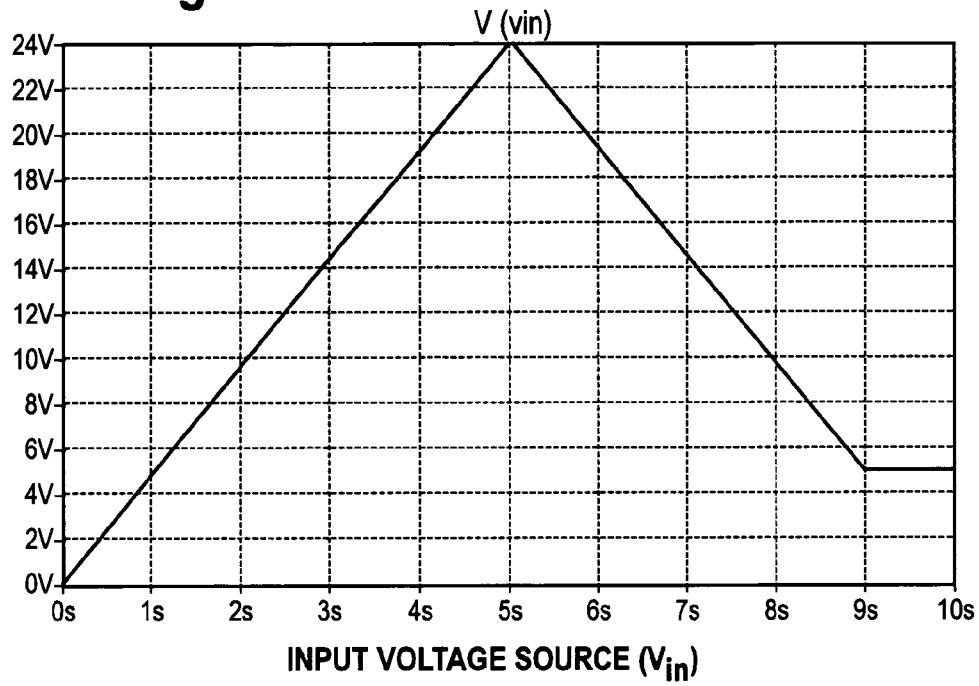
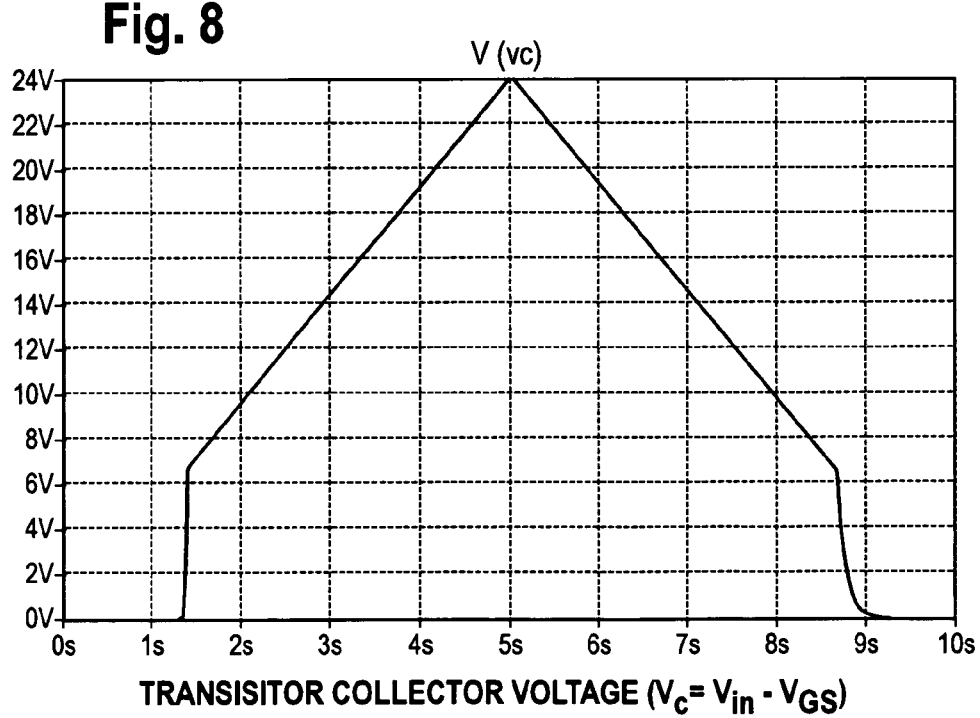

VOLTAGE AT ZENER ($V_z$), AND OUTPUT VOLTAGE ($V_{out}$)

TIME DELAY RESPONSE

INTEGRATED VARIABLE OUTPUT POWER SUPPLY PROTECTION CIRCUIT

BACKGROUND OF THE INVENTION

The present invention relates to a method and apparatus for the protection of a variable output power supply circuit for operation in an enclosed space. More specifically, the present invention preferably includes power coupler containing a reusable, integrated apparatus for providing both the voltage and current requirements to a device at a power output (for an active-load-device), while at the same time protecting the device at the output from over-voltage or over-current conditions due to abnormal conditions such as line shorts, opens, or other potentially dangerous conditions.

SUMMARY

Modern electronic devices involve a number of challenges for power supply and the safety of such supply. For instance, consumer electronics devices can include power sensitive integrated circuits and other electronics components which are susceptible to damage from overload conditions. In various applications (e.g., secure environments, such as retail or point of sale placements) it is important that such electronics devices have a safe and reliable power supply in addition to a security connection to prevent theft or tampering.

Unfortunately, a number of problems need to be considered in order to ensure the safe and consistent delivery of power under the variable operating conditions of such electronics devices. For instance, the variable power requirements under which such electronics devices operate may require a wide—if brief—variance in the current draw required to operate the device in its intended manner. For instance, certain digital cameras may need a significant increase in available current in order to operate a flash feature. However, simply providing a long term increase in the supply voltage to provide the current for such events could damage sensitive circuitry in an electronic device. In addition, there may occur certain variances (surges) in the power supply which the power couple can account for in preventing overvoltage events from harming the coupled electronic device.

A power coupler circuit needs to be able to account for other malfunctions as well. For instance, the cabling input providing the power supply may short, and thus a variance in the power supply may not be helpful, and in fact may harm the electronic device. Similarly, cabling may have a short at the output of the electronic device, or the device itself may have failed for reasons unrelated to the power supply. In such a circumstance, a variance in the power supply may not help and in fact may damage the electronic device coupled to the power supply. Moreover, the power coupler circuit preferably should be able to handle repeat occurrences of the full array of these events without requiring any replacement of the power coupler circuit or its attendant loss of use of the power coupler or its attached electronic device.

Thus, there is a need to provide a power coupler including a reusable, solid-state, power control circuit which detects the desired current level of an attached power consuming electronic device and adjusts power delivery based upon the variable current needs of that device, while preventing excessive voltage from harming the electronic device. In addition, there is a need for such a power control circuit which can protect a system from power output shorts, such as events when there exists a short at the output, or the electronic device itself has failed.

DESCRIPTION OF THE PRIOR ART

Various prior approaches involve so called "intelligent power delivery systems" which rely upon microprocessors, CPUs, or the like in a feedback system to adjust power supplies depending upon the desired level of voltage. However, such systems can be fooled in operation if, for instance, the cabling providing feedback to the intelligent system is shorted. For instance, if such an intelligent power module responds to the differential input feedback, when the feedback lines short to each other or to $V^+$, the intelligent power module responds by increasing the power output. Because of this, the voltage can ramp-up to unacceptably high voltage levels, such that in most, the electronic device at the output could break-down, and become damaged.

Other prior approaches include the use of certain types of fuses (e.g., circuits including a so called "crowbar zener") which short to ground once the voltage exceeds the limit of the zener diode. In many power applications, such fuses are used to protect the power source and the connective conductors in the case of an overvoltage problem with the load. This fuse approach, however, has at least three limitations: 1) the fuse, once blown, must be replaced, and thus is not reusable; 2) the zener diodes used with such systems have fixed values and thus are usable only with a single, fixed load limit; and 3) such fuses only account for overvoltage conditions, not shorts.

Other available approaches involve the use of one or more switches, e.g., so called hi-side drivers which provide power to a device depending upon the power supply needs of an electrical device or system. However, such switches are known only for providing power to an output where needed, as opposed to responding to and solving overvoltage conditions. In other words, the use of mere switches for responding to power supply demands by an electrical device or system may not address voltage limitations of the device or system, and thus, the intended operation of the switches might damage or break the electrical device they are intended to power.

Instead, what is needed is a reusable power supply circuit which has the ability to address variable power supply situations including both overvoltage and short conditions.

DEFINITION OF TERMS

The following terms are used in the claims of the patent as filed and are intended to have their broadest plain and ordinary meaning consistent with the requirements of the law:

Active load device: Means an electronic device or system (e.g., a consumer electronic device) which requires a power supply to operate.

Intelligent power supply system: a system which monitors and varies power supplied to an active load device depending upon factors such as feedback indicating the power requirements of the active load device.

Power coupler: This is the physical structure which houses the power supply circuit of the present invention and facilitates the physical connection between the power cable and the active load device. The power coupler may include (but does not require) additional connections and feedback to provide for additional support to the active load device, e.g., security or anti-theft connections. A commercially available example of a power coupler is a JST connector.

Where alternative meanings are possible, the broadest meaning is intended. All words used in the claims set forth below are intended to be used in the normal, customary usage of grammar and the English language.

OBJECTS AND SUMMARY OF THE INVENTION

The apparatus of the present invention generally includes a power supply circuit which is mounted inside the housing of a power coupler. This circuit will work in conjunction with a power delivery system in protecting the electronic device (sometimes known as the active load device) at the power output. The apparatus typically includes a first and second transistor. During the power up or initial power supply through the power cable to the power coupler, once the source to gate voltage exceeds an initial threshold a first transistor turns on to supply power to an active load device. A preferred version of this power supply circuit further includes two resistors connected to the output of the circuit so as to supply feedback to an intelligent monitoring system to provide and adjust as necessary the power supply to the active load device. Based on the value of the two feedback resistors, the intelligent power supply module defaults the output voltage and current to a predetermined value (i.e., preferably the voltage rating of the power coupler). If the active load device requires an increase in current (e.g., charging a flash for a digital camera), the power circuit facilitates a temporary drop in the output voltage until the power supply responds (because of the two feedback resistors) by readjusting for the change in requirements. When the device no longer needs this surge of current, the output voltage will temporarily rise until the power supply responds by readjusting for the requirement back to the predetermined values.

The power circuit of the present invention further includes a zener diode. The zener diode has a reverse break-down voltage which is higher than the power coupler's voltage rating. Since the zener diode is reverse-biased, this means that the zener diode is not in conduction mode during normal operation. However, the zener diode also has a reverse breakdown voltage which is lower than the maximum voltage rating of the active device for which the power coupler is intended. If a fault occurs (e.g., the feedback lines short to each other or to the high side voltage), the module responds by increasing the power output. However, the power supply circuit of the present invention will prevent excessive voltage conditions from damaging the active device or the coupler. Specifically, when the increase in the input voltage exceeds the breakdown voltage of the zener diode, current begins to flow through a resistor and a second transistor. Once the second transistor turns on, it reduces the voltage flowing through the first transistor. Eventually, the second transistor at saturation causes the voltage passing through the first transistor to drop below the threshold value, and thus turns the first transistor off, preventing current from flowing through the power coupler and into the active device.

The immediate application of the present invention will be seen in improving and further protecting power supply circuits and active load devices used in smart power supply systems, though those of skill will see that the present invention could be applied to other power coupler applications using a constant voltage output.

Thus, it can be seen that one object of the disclosed invention is to provide a cost effective and reusable sold state power supply circuit for protecting a power coupler and an active load device under a variety of power supply conditions.

A further object of the present invention is to provide a power supply control circuit which can adjust and control the power supply under both overvoltage and short conditions.

Still another object of the present invention is to provide a power coupler with an integrated power supply control circuit which can compensate for active device and line short failures which might otherwise provide a damaging power surge from a smart power supply system.

Yet another object of the present invention is to provide a self regulating power supply control circuit which operates with a minimum number of components and is responsive to a variety of power load requirements.

It should be noted that not every embodiment of the claimed invention will accomplish each of the objects of the invention set forth above. For instance, certain claimed embodiments of the invention will not require feedback circuits so as to adjust the voltage input to the active device. In addition, further objects of the invention will become apparent based upon the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

BRIEF DESCRIPTION OF THE DRAWINGS

FIG. 3 shows an example prophetic power supply graph reflecting the operation of the power supply control circuit of the present invention in response to an increase in the current demand by the active load device.

FIG. 4 shows an example power supply circuit practicing certain features of the claimed invention with current flow indicated for both normal and fault conditions.

FIG. 7 shows a graph of the input voltage over time in a prophetic example of a transient power spike.

FIG. 8 shows a graph of the transistor collector voltage of the second transistor over time in a prophetic example of a transient power spike.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure, or in result are intended to be covered by the claims in this patent.

Figure 1:
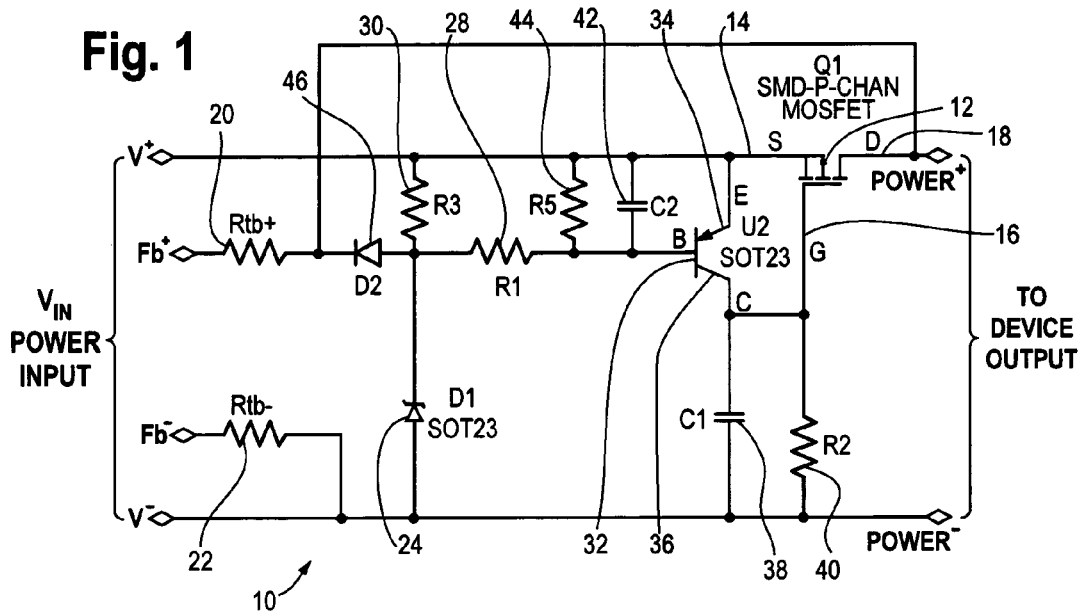
FIG. 1 shows a first preferred embodiment of a power supply control circuit practicing certain features of the present invention.

FIG. 1 shows a first preferred embodiment of the present invention as shown in a power supply control circuit which in this example is control circuit 10. Preferably, the control circuit is a solid state control circuit which is located on a printed circuit board (not shown) of sufficiently small size such that it can be placed in a JST housing of a power coupler. The control circuit 10 should also meet the safe touch requirement and should not exceed the temperature ratings of any of its components as described herein.

In a first preferred embodiment, the control circuit 10 includes a first transistor 12 (Q1). In the first preferred embodiment the first transistor 12 is a p-channel low profile SMD power MOSFET, though those of ordinary skill will be able to understand and apply the teachings of the present invention to other transistors and the like without departing from the scope of the present invention. The first transistor 12 has source (S) 14, gate (G) 16 and drain (D) 18 regions. During power up, the power coupler ramps up the voltage through $V_{IN}$. $V^+$ and $V^-$ is the power input to the Circuit ($V_{IN}$). $V_{IN}$ is supplied by the power supply (not shown). As the voltage across the first transistor 12 across source 14 to gate 16 $V_{SG}$ crosses a threshold into a predetermined range (e.g., between 1-2V), the first transistor 12 turns on, thus providing power to an active load device (not shown) via the output ($V_{OUT}$). Power$^+$ and Power$^-$ is the power output to the Device ($V_{OUT}$) supplied by the control circuit 10.

The control circuit 10 further includes feedback resistors 20 and 22 (Rfb$^+$ and Rfb$^-$, respectively) which provide positive and negative feedbacks (Fb+ and Fb–, respectively), which may be input to a controller (not shown) to adjust the output voltage and current to a desired, predetermined value (typically, the voltage rating of the power coupler). Rfb$^+$ and Rfb$^-$ connect back to a "smart" power control module (not shown) and the feedback values determine the voltage at which the power control module regulates. An example of commercially available smart power control modules of the type that the present invention is designed to work with are the Smart Power Modules sold by Vanguard Products Group of Oldsmar, Fla. Those of skill will understand that the value of the feedback resistors 20 and 22 may vary depending upon the type of power coupler which houses the control circuit 10.

Next, the power control circuit 10 further includes a zener diode (Z1) 24, which prevents overvoltage conditions from damaging the power coupling or the active control device. In this first preferred embodiment, the zener diode has a ¼ Watt rating, though those of skill will understand that the ratings for this component may vary without departing from the scope of the present invention. The zener diode 24 has a reverse break down voltage which is higher than the power coupler's voltage rating, the zener diode 24 is reverse biased and not in conduction mode. Thus, the voltage across zener diode 24 during normal operating conditions is as follows:

$$V_{Z1}=V_{IN}<<V_{Zbreakdown}$$

However, in overvoltage conditions, the control circuit uses a second transistor (Q2) 26, which is connected to the zener diode 24 via resistor R1 28 and the power input via resistors R3 30 and R1 28. In this first preferred embodiment the second transistor 26 is a PNP general purpose transistor, though other variants will fall within the scope of the present invention. The purpose of the second transistor 26 is, at saturation, to turn off the first transistor 12 by reducing the $V_{SG}$ of the first transistor below its threshold value (1 Volt in the example of FIG. 1). Because of the reverse bias and non-conductive mode of the zener diode 24 during normal operation, no current (except for leakage current) is flowing through: Z1; R3; or R1, i.e.:

$$I_{Z1}=I_B=I_E=I_C=0$$

Where $I_B$, $I_E$, and $I_C$, are the representative currents flowing through the Base 32, Emitter 34, and Collector 36 of the second transistor 26. In order to turn the second transistor on, $\beta I_B=I_C>>0$, where $\beta$=the amplification factor of the transistor. This means that during the normal operation of the control circuit 10, the second transistor 26 is completely off, allowing the source-to-gate voltage ($V_{GS}$) of the first transistor 12 to rise beyond its threshold (after a delay of 0.7τ to 1.4τ), turning on the first transistor 12 and providing power to the output ($V_{OUT}$) for the active load device. The control circuit 10 further includes a capacitor (C1) 38 and resistor (R2) 40 coupled to the first transistor to generate the delay time constant (τ=RC), as well as a second time constant generating circuit comprising capacitor (C2) 42 and resistor (R5) 44. These two time constant circuits work with one another to deal with the initial rush of current which may be provided to the active load device. In this embodiment, a function of the time constant circuit is to prevent transistor (Q2) 26 on prematurely, as well as to prevent the first transistor (Q1) 12 from turning off prematurely. These two time constants work in a complimentary fashion to accommodate a variable power factors, thus ensuring that the power control circuit 10 is capable of furnishing whatever requirements whether small or large of instantaneous current by device or set of devices at the output. For instance, the present invention could be used with these multiple time constant circuits to support capacitive or inductive loads (e.g., a motor or a flash), despite the differences in those load characteristics.

Figure 2:
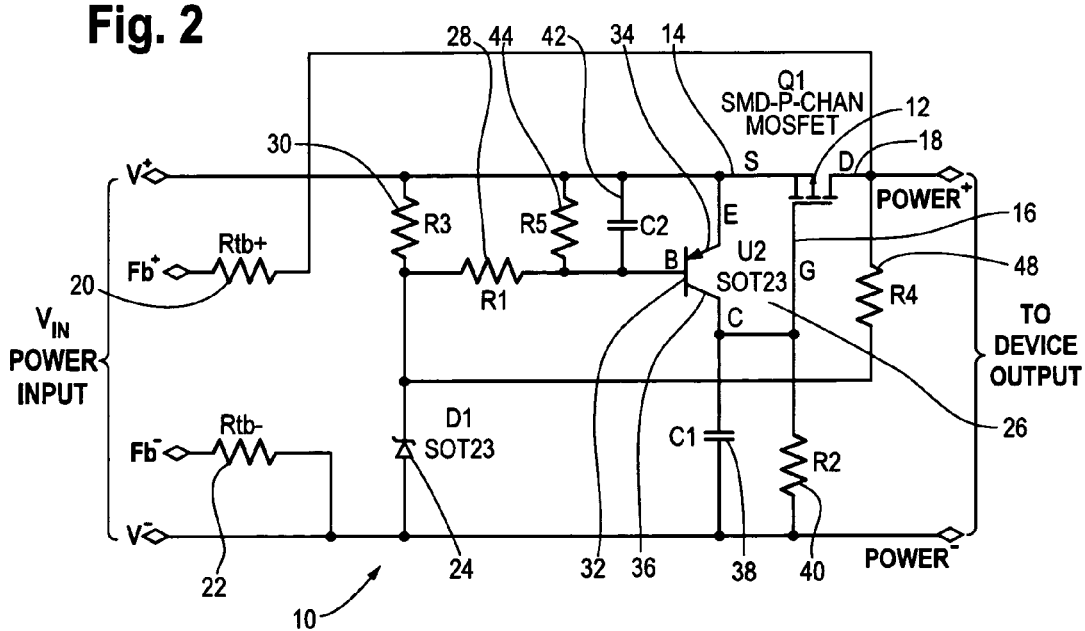
FIG. 2 shows a second preferred embodiment of a power supply control circuit practicing certain features of the present invention.

Also as shown in FIG. 1, an embodiment of the control circuit 10 of the present invention can include a diode (D2) 46 which operates in conjunction with feedback resistor 20. Alternatively, as shown in FIG. 2, other components such as resistor (R4) 48 may be used, although those of skill will understand that that component could be substituted with a combination of voltage divider(s) or resistors or the like. This structure, in whichever variant is used, performs a function of power coupler protection in the event of a line short or active load device failure. Other modifications, substitutions and additions could be made to the control circuit 10 in light of the teachings herein without departing from the scope of the invention.

Under normal operating conditions when the power coupler is supplying power to the active load device, then the power supply voltage across this power coupler protection circuit (whether diode 46, resistor 48, a voltage divider or some other structure) Unit is whatever the output voltage is with respect to Power+.

The function of the power coupler protection circuit occurs when the Power+ and Power– shorts those two wires or a fault occurs in the active load device itself (types of output short circuit conditions). When that happens, the polarity of the current through resistor 48 (or its alternate diode or voltage divider structures) is reversed. This causes a current conduction at the base of second resistor 26. If the overcurrent condition is high enough, e.g., in the case of a complete short, the emitter base voltage will default to a standard (0.7 volt in this embodiment), and the second transistor 26 will go into full conduction until it saturates, at which point after saturation, second transistor 26 turns ON, and the voltage of the emitter $V_{ec}$ will drop close to 0 or 0.4V max. At that point the Voltage drops below the Vsg of the first transistor 12, which turns off the first transistor, which results in turning off output power to the short. Once the short is removed, the power supply control circuit 10 will revert to its initial state, i.e., with the second transistor 26 no longer conducting such that the first transistor is turned off.

This power coupler protection circuit works (with Feedback resistors 20 and 22) to protect the power coupler and the active load device in the event of short circuits. This feature of the power supply control circuit 10 can work to account for short circuits both with and without intelligent power supply systems.

As shown in FIG. 3, if the active load device at the output requires a surge of current (that is below the maximum current rating) at any time, $V_{OUT}$ will temporarily drop until the smart power module responds (because of resistors Rfb$^+$ and Rfb$^-$) by readjusting for the requirement to require a higher amount of current. When the device no longer needs this surge of current, $V_{OUT}$ will temporarily rise until the smart power module responds by readjusting for the requirement in the opposite direction.

Figure 5:
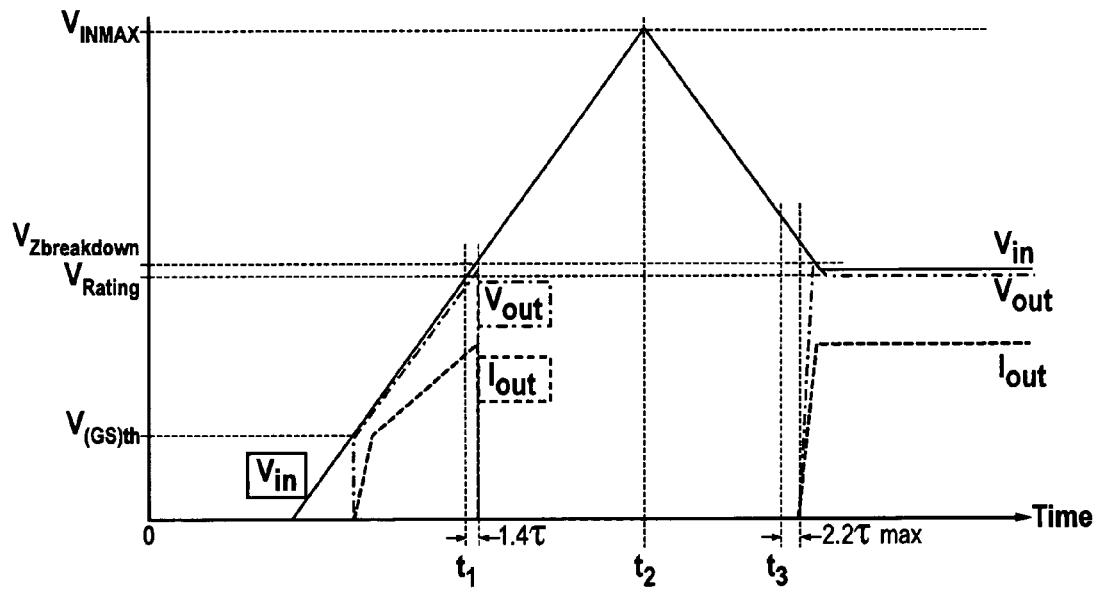
FIG. 5 shows an example prophetic power supply graph reflecting the change in power supply in the power coupler before, during and after fault conditions.
Figure 6:
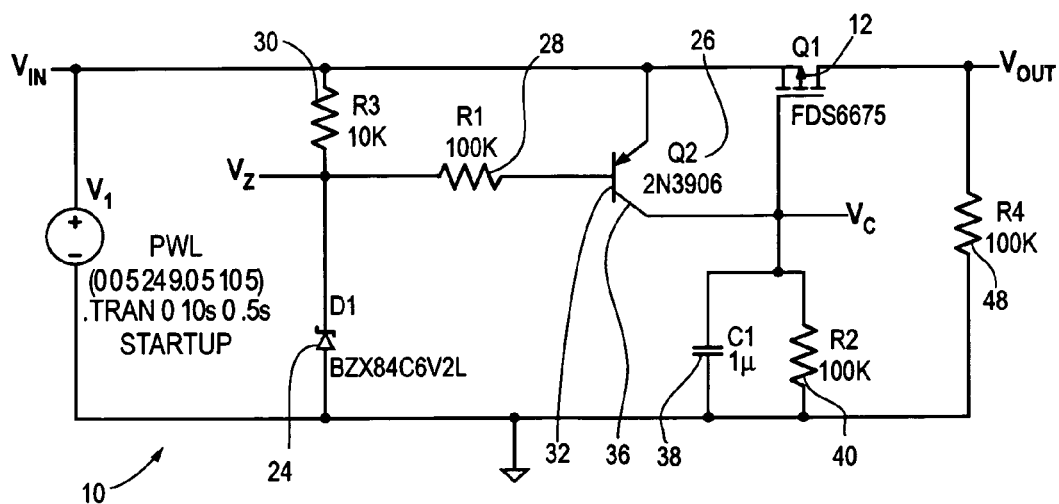
FIG. 6 shows yet another example power supply circuit practicing certain features of the present invention used in a prophetic example of a transient power spike.
Figure 9:
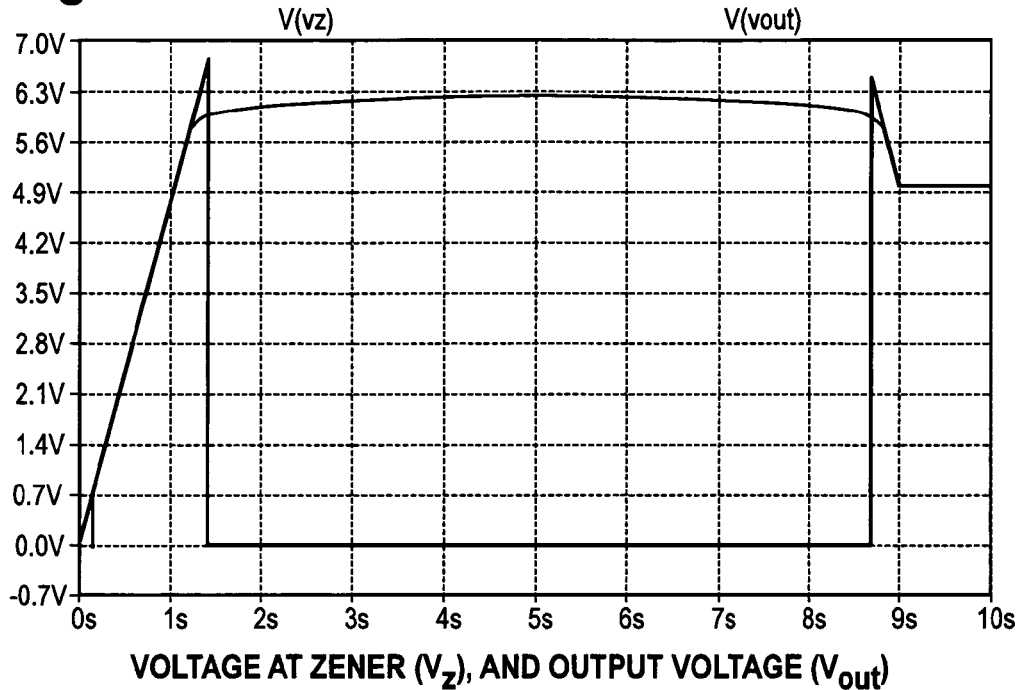
FIG. 9 shows a graph of the voltage at the zener diode and the power coupler output voltage over time in a prophetic example of a transient power spike.
Figure 10:
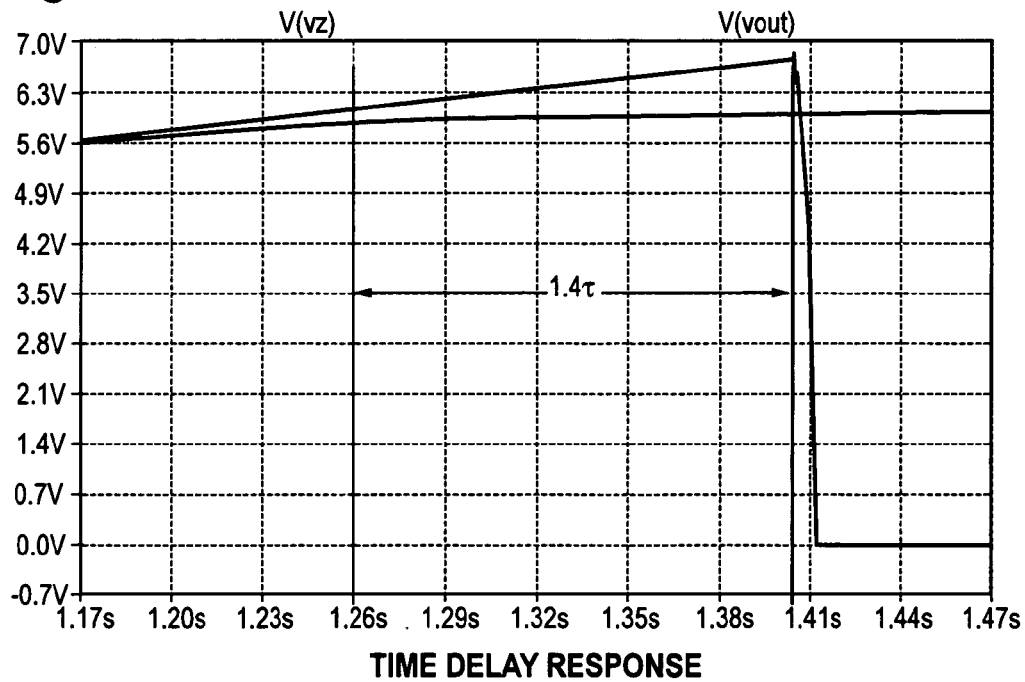
FIG. 10 shows a graph of the voltage time delay at the zener diode and the power coupler output over time in a prophetic example of a transient power spike.
Figure 11:
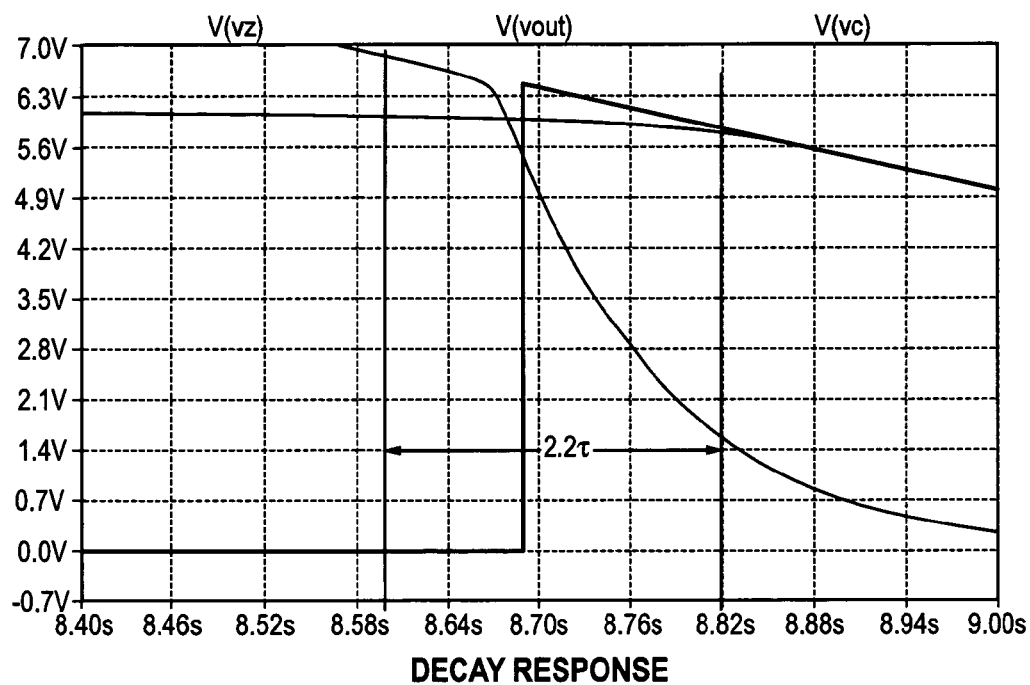
FIG. 11 shows a graph of the voltage time decay at the zener diode and the power coupler output over time in a prophetic example of a transient power spike.

FIGS. 4 and 5 show the power circuit 10 in graphical and flow representation in dealing with a fault condition. Fault conditions, such as a short or the like, are a problem, even with smart power delivery system. This is because of the way the smart power module responds to differential input feedback; when the lines (Fb$^+$ and Fb$^-$) either short to each other or to V$^+$, the module responds by increasing the power output. Because of this, the voltage can ramp-up to as high as 24Vdc (theoretically). In most cases, if not all, the device at the output could break-down, and become damaged.

$V_{IN}$ rises on the power control circuit 10 to the break-down voltage of zener diode (Z1) 24, at time $t_1$ (as shown in FIG. 5) current begins to flow through resistor R3 30, and through R1 28 to the base 34 of second transistor 26 (that current being shown in FIG. 4 as $I_B$). The first transistor Q1 12 will remain on until $V_{GS} \leq 1V$ (the example threshold in this preferred embodiment). As $V_{IN}$ continues to rise, the base current $I_B$ and base-emitter voltage $V_{EB}$ of the second transistor Q2 26 are negligible, until $V_{IN} \geq V_{Zbreakdown} = V_{Zr}$.

At saturation of the second transistor Q2 26, the voltage across the emitter 32 and base 34 is a diode-drop ($V_{EB} \approx 0.6V => 1.0V$ max.) and $V_{EC} = V_{GS} \approx 0V$, turning OFF Q1 such that $I_{OUT} = 0$. Saturation of second transistor Q2 26 will occur when:

$$I_C = V_{IN} \div R2 = I_E + I_B = \beta I_B$$

From the loop equations:

$$V_{EB} + V_{R1} - V_{R3} = 0; \text{ at } Q2_{SAT} => 1.0 + V_{R1} - V_{R3} = 0 = 1.0 + I_B R1 - V_{R3} \quad (1)$$

$$V_{EB} + V_{R1} + V_{Z1} - V_{IN} = 0; @Q2_{SAT} => 1.0 + V_{R1} + V_{Zr} - V_{IN} = 0 = 1.0 + I_B R1 + V_{Zr} - V_{IN} \quad (2)$$

$$V_{R3} + V_{Z1} - V_{IN} = 0 \quad (3)$$

The nodal equations then follow:

$$0 = I_B + I_{R3} - I_{Zr} \quad (4)$$

Then at Q2$_{SAT}$:

$$I_{Bmin} = (V_{R3} - 1.0) \div R1 = I_C \div \beta = V_{IN} \div (R2 \times \beta) = (V_{R3} + V_{Zr}) \div (R2 \times \beta)$$

Where: $V_{R3} > 1.0V >> V_{EB}$, and $V_{Zr}$ is the breakdown voltage for zener diode Z1 24.

Transistor Q2 26 will not saturate until the time constant delay is met, and $I_C \approx V_{IN} \div R2$. As the input voltage $V_{IN}$ is lowered below the zener diode Z1 24 breakdown voltage the process will reverse, based on the decay of 2.2τ. This is represented in FIG. 5 where at $t_1$ and $t_3$ $V_{Z1} = V_{Zr}$. At time $t_2$ is where the fault (Fb$^+$ to Fb$^-$ short) is removed.

FIGS. 6-11 show an analysis of a prophetic example of a transient voltage spike using a power couple with the power supply control circuit of the present invention. As an example, in this embodiment, a zener diode 24 rated at 6.2V is chosen and a simulated input voltage pulse from 0V to 24V is generated for 5 seconds and dropped back down to 0V. This pulse simulates the overvoltage conditions at the input during fault conditions, as well as the removal of the fault. Then the following nodes are shown to reflect the theory of operation of the present invention:

Input voltage ($V_{in}$=V1)
Zener diode voltage ($V_z$)
Transistor Collector voltage ($V_c$)
Output voltage ($V_{out}$)

The above description is not intended to limit the meaning of the words used in the following claims that define the invention. Rather, it is contemplated that future modifications in structure, function, or result will exist that are not substantial changes and that all such insubstantial changes in what is claimed are intended to be covered by the claims. For instance, the present invention could also work with additional solid state components beyond those shown in FIGS. 1 and 2. Likewise, it will be appreciated by those skilled in the art that various changes, additions, omissions, and modifications can be made to the illustrated embodiments without departing from the spirit of the present invention. All such modifications and changes are intended to be covered by the following claims.

What is claimed is:

1. A power control circuit for providing protection to an active load device, the power control circuit being housed within a power coupler module, said power control circuit comprising:
   a) a first transistor for receiving a power supply and for selectively providing a power output, said transistor turning on to provide said output in response to a source to gate voltage in excess of a predetermined threshold;
   b) a zener diode, said zener diode having a breakdown voltage level which is higher than said predetermined threshold voltage level of said first transistor, said zener diode further operatively coupled for receiving said power supply; and
   c) a second transistor operatively connected to said zener diode and receiving current from said power source only when said power source exceeds said breakdown voltage of said zener diode, said receipt of current from said power source thereby reducing the source to gate voltage to said first transistor so as to turn said first transistor off, thereby removing the power output from said first transistor when said power source maintains a power supply voltage above said zener diode breakdown voltage level, wherein said first transistor automatically reverts to providing power output upon said power source reverting below the breakdown voltage of the zener diode.

2. A power control circuit for providing protection to an active load device and power from a variable power supply module, the power control circuit being housed within a power coupler module, said power control circuit comprising:
   a) a first transistor for receiving a variable power supply and for selectively providing a power output, said transistor turning on to provide said output in response to a source to gate voltage in excess of a predetermined threshold;

b) a feedback circuit operatively connected to the power output of said first transistor for providing a power output feedback signal to said variable power supply module so as to selectively increase and decrease the variable power supply in response to the power needs of said active load device;

c) a zener diode, said zener diode having a breakdown voltage level which is higher than said predetermined threshold voltage level of said first transistor, said zener diode further operatively coupled for receiving said variable power supply;

d) a second transistor operatively connected to said zener diode and receiving current from said variable power supply only when said variable power supply exceeds said breakdown voltage of said zener diode, said receipt of current from said variable power supply thereby reducing the source to gate voltage to said first transistor so as to turn said first transistor off, thereby removing the variable power supply from said first transistor when said power source maintains a power supply voltage above said zener diode breakdown voltage level; and e) a power coupler protection circuit for protection from output short circuits, said power coupler protection circuit reversing polarity in the event of output short circuit conditions, said power coupler protection supplying current to said second transistor in the event of short circuit conditions, whereby said second transistor turns on and causes said first transistor to turn off, thus removing the power supply to the active load device.

3. The power control circuit of claim 2, further comprising a time delay circuit operatively connected to said second transistor, said time delay circuit delaying the turning off of the first transistor, said time delay circuit delaying turning on the second transistor in response in the event of both over voltage and over current conditions.

* * * * *